United States Patent [19]

Grisar et al.

[11] 4,074,936
[45] Feb. 21, 1978

[54] METHOD AND APPARATUS FOR ANALYZING A COMPOSITION OF AN ALLOY

[75] Inventors: Ulrich Grisar; Wilhelm Berstermann, both of Georgsmarienhutte, Germany

[73] Assignee: Klöckner-Werke AG, Duisburg, Germany

[21] Appl. No.: 665,774

[22] Filed: Mar. 10, 1976

[30] Foreign Application Priority Data

Mar. 26, 1975 Germany ............................ 2513266

[51] Int. Cl.² ............................ G01J 3/36; G01J 3/30
[52] U.S. Cl. ........................................ 356/81; 356/77; 356/79; 356/86
[58] Field of Search ........................ 356/77, 79, 81, 86

[56] References Cited

U.S. PATENT DOCUMENTS 2,577,815 12/1951 Saunderson et al. .................. 356/81
3,227,038 1/1966 Earle ....................................... 356/81

Primary Examiner—Vincent P. McGraw
Attorney, Agent, or Firm—Michael J. Striker

[57] ABSTRACT

An alloy to be tested is formed of a basis metal and a plurality of alloying elements. A diffraction spectrum having lines corresponding to the basis metal and to each of the alloying elements is generated from the alloy by sparking and electrical signals each having an intensity proportional to the intensity of a respective one of the lines of the spectrum are formed. Each of these signals is integrated and the integrated signals corresponding to lines of the alloy elements are each compared with the integrated signal corresponding to the line of the basis metal and difference signals are generated. These difference signals are evaluated by being passed through a threshold circuit which sounds an alarm when they lie outside a predetermined range. The device can be calibrated by comparing each of the signals corresponding to one of the alloying elements with only a portion of the signal corresponding to the basis metal so that the arrangement can be set up to generate an output only when the alloy being sampled has a composition different from a predetermined calibrated composition.

15 Claims, 2 Drawing Figures

METHOD AND APPARATUS FOR ANALYZING A COMPOSITION OF AN ALLOY

CROSS-REFERENCE TO RELATED APPLICATIONS

This application relates to our copending applications Ser. Nos. 665,770–665,773 filed on Mar. 10, 1977.

BACKGROUND OF THE INVENTION

The present invention relates to a method of and an apparatus for testing an alloy. More particularly this invention concerns a system for determining the composition of a metal alloy, by comparison with a given testpiece.

It is frequently necessary in the steel-making industry periodically to test the composition of the alloy being produced. In a rolling mill or the like it is also often required to verify the composition of the bars, blooms, or billets that are delivered, as an attempt to roll or draw the wrong type of steel can result in damage to the mill machinery.

The necessary quantitative and qualitative analysis is typically carried out in the plant laboratory. A unipolar spark is passed between an electrode and a sample of the workpiece. The light produced by this spark is reflected off a concave diffraction grating so as to produce a diffraction spectrum. The spectrum lines of interest, that is those representing for example iron, chrome, copper, molybdenum, or carbon, are converted into electronic signals having a signal level proportional to the respective line intensity. These various signals are then fed to a computer which can analyse them and print out the composition of the alloy.

Although such an arrangement is extremely accurate, producing an analysis that recites all of the important possible constituents of the alloy, it does not lend itself to the continuous surveillance of alloy composition, which frequently can vary from charge to charge in a steel plant. Furthermore, the complexity of this analysis system makes it unsuitable in an automatic sorting operation, as the complex analysis takes considerable equipment and time. Thus the industrial solution has been to make periodic analyses of the product, balancing on the one hand the feasibility of the frequent stoppage for analyzing and on the other hand the necessity of controlling product quality.

SUMMARY OF THE INVENTION

It is therefore an object of the present invention to provide an improved method of and apparatus for testing an alloy formed of a basic metal and a plurality of alloying elements.

Another object is the provision of such a system which can readily be used in the continuous surveillance of product composition.

These objects are attained according to the present invention in an apparatus where a diffraction spectrum having lines corresponding to the basic metal and each of the alloying elements is generated. Each of these lines is converted into an electrical signal having an intensity proportional to the intensity of the respective line. These signals are all integrated for the same period of time and then each of the integrated signals corresponding to the line of one of the alloying elements is fed to one input of a respective comparator and the other input of each of the comparators receives the adjustable portion of the integrated signal corresponding to the line for the basis metal. The comparators generate difference signals corresponding to the difference between their inputs, and these difference signals are fed to a display.

The portion of the integrated signal of the basis metal is adjusted so that in testing the given test piece the difference signal becomes zero. Workpieces in test correspond to the testpiece, if no signal occurs. In accordance with another feature of this invention difference signals corresponding to deviations non important for practical applications can be suppressed. Provision of a threshold circuit for each of the comparators makes the system able to respond only when one of the tested alloying elements varies beyond predetermined ranges determined by the respective threshold circuits.

In accordance with another feature of this invention a plurality of signalling devices constitute the display. These devices each correspond to a respective alloying element and are activated, as for example by lighting up, when the respective alloying element varies from the predetermined range. An acoustic alarm may also be provided.

With the system according to the present invention it is entirely possible continuously to survey the composition of workpieces passing a given point. The device operates in a very simple manner and only produces an output which must be reacted to by the production staff when a workpiece having an undesirable composition is analyzed. Otherwise the device requires virtually no surveillance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
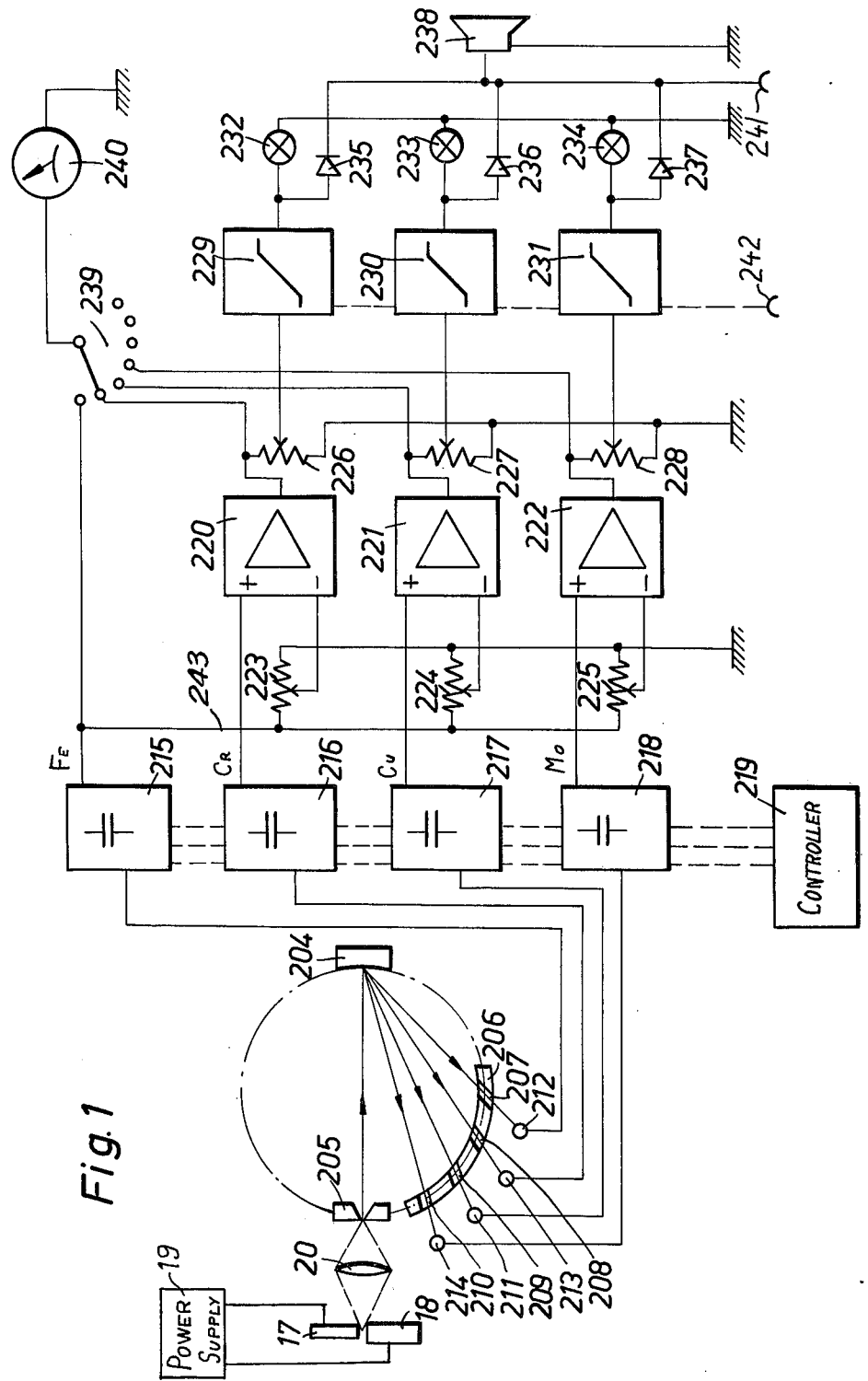
FIG. 1 is a schematic view of the system according to the present invention.

The arrangement shown in FIG. 1 is employed for testing the composition of an alloy workpiece 18 which is juxtaposed with an electrode 17 connected to one side of a power supply 19 whose other side is connected to this workpiece 18. A unipolar electrical spark is therefore fired between the two elements 17 and 18. A lens 20 picks up this spark and focuses it through the primary gap 205 of a Rowland-type diffraction grating having a concave mirror 204 that focuses on a concave surface 206 having the same center of curvature as the mirror 204 and formed with four slots 207–210 angularly offset and all opening toward the central focal point of the mirror 204. These slots 207–210 each, therefore, pass a respective spectrum line to a respective photocell 212, 213, 211, and 214. The angular spacing of the slots 207–210 on the surface 206 determines which components of the workpiece sample 18 are to be analyzed, and each of the photocells 211–214 will therefore produce an output signal whose electrical level will be proportional to the intensity of the spectrum falling on it. In the illustrated system the slot 207 is aligned to receive the spectral line for iron, the slot 208 the spectral line for chromium, the slot 209 the spectral line for copper, and the slot 210 the spectral line for molybdenum.

Each of these photocells 211, 212, 213 and 214 is connected to a respective integrator 217, 215, 216 and 218. These integrators 215–218, which will be described in more detail below, are operated by a clock-type controller 219. Each of these integrators 215–218 therefore produce an integrated electrical signal having a voltage level proportional to the intensity of the respective spectrum line.

The outputs of the three alloying-element integrators 216, 217, and 218 are each fed to one uninverted input of a differential amplifier 220, 221 and 222, respectively. The output signal of the iron or basis-metal integrator 215 is fed to one side of each of three potentiometers 223, 224 and 225 whose other sides are grounded and each of of which has a wiper connected to the inverted input of a respective one of the differential amplifiers 220, 221, and 222. These differential amplifiers 220, 221 and 222 therefore produce respective output signals corresponding to the difference between their respective inputs, these output signals each having applied across a respective potentiometer 226, 227 and 228 whose other side is grounded.

A selector switch 239 can connect a voltmeter 240 to the outputs of each of the differential amplifiers 220, 221 and 222 as well as to the output of the basis-metal integrator 215. The wipers of the potentiometers 226, 227 and 228 are connected to respective threshold circuits 229, 230 and 231 in turn connected to respective visual signals 232, 233 and 234 which illuminate when the level of the signal detected by the respective threshold circuit exceeds a predetermined threshold level. In addition the outputs of these threshold circuits 229, 230 and 231 are connected via diodes 235, 236 and 237 to an acoustic signaller 238, here a speaker.

An outlet jack 241 is provided with the speaker 238 to allow a remote alarm to be connected, and connections 242 are provided to the threshold devices 229–231.

The system according to the present invention functions as follows:

Assuming that the device is to be set up to not act only if a sample has a composition of say, 80% iron, 5% chromium, 10% copper, and 5% molybdenum, a test sample 18 having the desired composition is placed under the electrode 17 and a spark is passed between this electrode 17 and the workpiece 18. The resultant signals on the outputs of the integrators 215, 216, 217 and 218 are then weighed against one another by varying the respective potentiometers 223, 224 or 225 one after the other with the voltmeter 240 connected to the output of the respective differential amplifier 220, 221 or 222 so as to reduce this output to zero. The ranges can then be determined by setting the potentiometers 226, 227 and 228 to establish just how much the output signal of the differential amplifiers can vary before the respective threshold device will trigger the respective signal.

Although discussion has been made above to a mainly iron alloy, it lies within the scope of this invention to test any other type of alloy, the positioning of the slots 207–210 determining just what components of the test sample are being analyzed.

Figure 2:
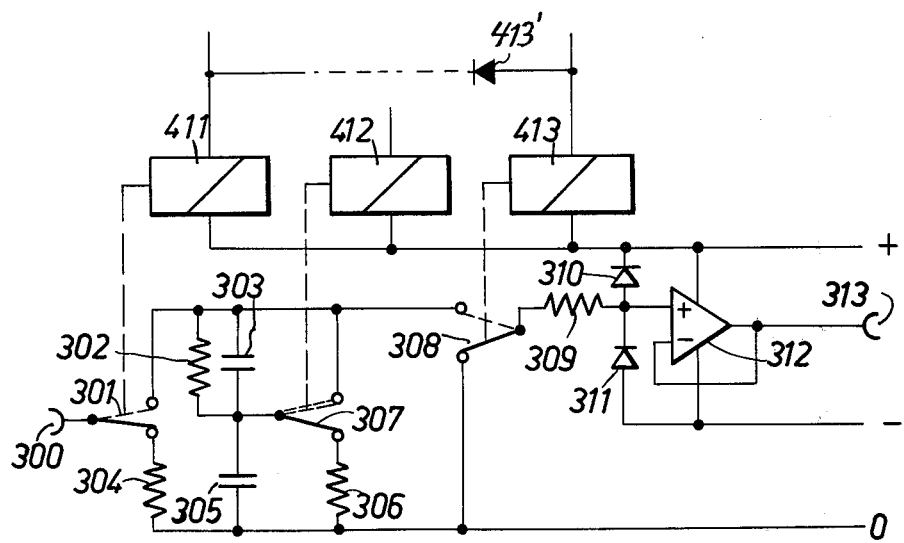
FIG. 2 is a schematic view of a detail of FIG. 1.

FIG. 2 shows an integrator having an input 300 from the respective photocell. A relay 41 when not activated by the controller 219 connects the input 300 with its pole 310 through a resistor 304 to ground. When the relay 411 is switched on, however, its pole 301 connects the photocell input 300 to a resistor 302 and a capacitor 303 in parallel with each other and connected on their other sides to a pole 307 of a relay 412 and through a capacitor 305 to ground. Absent activation of the relay 412 the pole 307 connects a resistor 306 across the capacitor 305, but electrical actuation of this relay 412 causes the pole 307 to shunt across the resistor 302 and capacitor 303, thereby connecting the capacitor 305 to one terminal of a relay 413 having a pole 308. The pole 308 normally connects one input of a FET operational amplifier 312 through the resistor 309 to ground. When actuated the relay 413, however, connects the input of this operational amplifier 312 as shown in dashed line. Overload-protecting diodes 310 and 311 are connected across the operational amplifier 312 which has an output 313 that is adapted to be connected to a differential amplifier as described above. The charge of the capacitor 305 appears at the output 313 when the poles 307 and 308 are in the dashed-line position. During the integration the poles 301 and 307 lie in their dashed-line positions.

The integrator 215 of FIG. 1 for the reference has an additional diode 413' as shown in dashed-lines (FIG. 2) which actuates relay 413 together with relay 411 actuating the voltage of capacitor 305 appearing at the output 243.

It is possible to use this device right in a production line to ascertain the composition of workpieces passing along the line. Furthermore, an automatic sorter connected to the output 241 can be employed automatically to shunt aside any workpiece which does not have a composition within the desired range.

It will be understood that each of the elements described above, or two or more together, may also find a useful application in other types of testers differing from the type described above.

While the invention has been illustrated and described as embodied in an alloy tester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of testing an alloy formed of a basis metal and a plurality of alloying elements by comparison with a given test piece, said method comprising the steps of:
   generating from said alloy a diffraction spectrum having a basis line corresponding to said basis metal and alloy lines corresponding to each of said alloying elements;
   forming a plurality of electrical signals each corresponding to a respective one of said lines and each having a signal level corresponding to the intensity of the respective line;
   integrating each of said signals;
   simultaneously comparing each of the integrated alloy signals with an adjustable portion of the integrated basis signal and generating a plurality of difference signals; and simultaneously evaluating all of said difference signals.

2. A method of testing an alloy formed of a basis metal and a plurality of alloying elements by comparison with a given test piece, said method comprising the steps of:

generating from said alloy a diffraction spectrum having a line corresponding to said basis metal and lines corresponding to each of said alloying elements;

forming a plurality of electrical signals each corresponding to a respective one of said lines and each having a signal level corresponding to the intensity of the respective line;

integrating each of said signals;

comparing each of the integrated signal corresponding to the lines of said alloy elements with an adjustable portion of the integrated signal corresponding to the line of the basis metal and generating a plurality of difference signals; and evaluating said difference signals by feeding same to a display upon exceeding respective predetermined threshold levels.

3. The method defined in claim 2, wherein each of the integrated alloy element signals is compared with a respective portion of the integrated basis metal signal, said method further comprising the step of setting the portions of said integrated basis metal signal to be compared to said integrated alloy element signals so that said difference signals are minimized when the alloy being tested has a predetermined desired composition.

4. A method of testing an alloy formed of a basis metal and a plurality of alloying elements by comparison with a given test piece, said method comprising the steps of:

generating from said alloy a diffraction spectrum having a line corresponding to said basis metal and lines corresponding to each of said alloying elements;

forming a plurality of electrical signals each corresponding to a respective one of said lines and each having a signal level corresponding to the intensity of the respective line;

integrating each of said signals;

comparing each of the integrated signals corresponding to the lines of said alloy elements with a respective portion of the integrated signal corresponding to the line of the basis metal and generating a plurality of difference signals;

setting the portions of the integrated signal corresponding to the line of said basis metal to the integrated signals corresponding to the lines of said alloy elements so that said difference signals are minimized when the alloy being tested has a predetermined desired composition; and evaluating said difference signals by feeding same to a display only when they lie outside predetermined respective ranges, whereby said display is only activated when an alloy is tested whose composition varies from the ranges.

5. An apparatus for testing an alloy formed of a basis metal and a plurality of alloying elements, said apparatus comprising:

means for generating a diffraction spectrum having lines corresponding to said basis metal and to each of said alloying elements;

means for converting each of said lines into an electrical signal having a signal level corresponding to the intensity of the respective line;

means for integrating said signals and for forming respective integrated signals corresponding thereto;

means for deriving from the integrated signal corresponding to the line for said basis metal a plurality of partial alloy signals each for a respective alloying element;

a plurality of comparators each having one input receiving one of said integrated signals corresponding to the line for one of said alloying elements, another input receiving a respective partial alloy signal, and an output carrying an output signal corresponding to the difference between the signals received by the respective inputs; and a display connected to each of said outputs.

6. An apparatus for testing an alloy formed of a basis metal and a plurality of alloying elements, said apparatus comprising:

means for generating a diffraction spectrum having lines corresponding to said basis metal and to each of said alloying elements;

means for converting each of said lines into an electrical signal having a signal level corresponding to the intensity of the respective line;

means for integrating said signals and for forming respective integrated signals corresponding thereto;

a plurality of comparators each having one input receiving one of said integrated signals corresponding to the line for a respective one of said alloying elements, another input receiving the integrated signal corresponding to the line for said basis metal, and an output carrying an output signal corresponding to the difference between the signals received by the respective inputs;

a display connected to each of said outputs; and threshold circuits between each of said outputs and said display for feeding the respective output signal to said display only when the respective output signal lies without a predetermined range.

7. The apparatus defined in claim 6, further comprising a plurality of adjustable voltage dividers each connected between the integrating means for the basis metal signal and said other inputs of said comparators, whereby only a portion of the integrated basis metal signal can be compared with the integrated alloy element signals.

8. The apparatus defined in claim 6, wherein said display includes a lamp connected to each of said outputs.

9. The apparatus defined in claim 6, wherein said display includes an audible alarm connected to said outputs.

10. Apparatus defined in claim 6, wherein said means for generating includes a diffraction grating, and said means for converting includes a mask in line with said grating and formed with a plurality of slits and a photocell behind each of said slits.

11. A method of determining whether an alloy contains substantially the same proportion of a plurality of given alloying elements as a test piece, said method comprising the steps of:

spectroscopically analyzing the alloy and generating a plurality of alloy reference signals each corresponding to the proportion of a respective alloying element in the alloy;

establishing each of said reference signals as a respective reference level for a respective alloying element;

spectroscopically analyzing the test piece and generating a plurality of alloy test signals each corresponding to the proportion of a respective alloying element in the test piece;

comparing each of said test signals with the respective reference level for the same alloying element and generating difference signals each corresponding to the extent of variation in proportion of the respective element between the alloy and the test piece; and evaluating said difference signals.

12. A method of determining whether an alloy including a basis metal contains the same proportion of a plurality of alloying elements as a test piece containing substantially the same proportion of the basis metal as the alloy, said method comprising the steps of:

generating from the alloy a diffraction spectrum having a line corresponding to said basis metal and lines corresponding to each of said alloying elements;

forming a basis reference signal having a signal level corresponding to the intensity of said line of said basis metal and a plurality of alloy reference signals having respective signal levels corresponding to the respective intensities of said lines of said alloying elements;

comparing said alloy reference signals with respective portions of said basis reference signal and generating a plurality of difference signals;

varying each of said portions so as to minimize the respective difference signal and thereby establishing for each of said alloying elements a respective alloy ratio between the respective alloy reference signal and said basis reference signal;

generating from the test piece a diffraction spectrum having a line corresponding to said basis metal and lines corresponding to each of said alloying elements;

forming a basis test signal having a signal level corresponding to the intensity of said line of said basis metal for said test piece and a plurality of alloy test signals having respective signal levels corresponding to the respective intensities of said lines of said alloying elements of said test piece;

comparing said alloy test signals with respective proportions of said basis test signal and generating a plurality of test difference signals;

setting the portions of said basis test signal with which said alloy test signals are compared in accordance with the alloy ratios for the respective alloying elements established for the alloy; and evaluating said test difference signals.

13. The method defined in claim 12, further comprising the steps of integrating said reference signals and said test signals prior to comparing same with portions of the respective basis signals.

14. The method defined in claim 12, wherein said test difference signals are evaluated by being fed to a display.

15. The method defined in claim 14, wherein said test difference signals are only fed to a display when they exceed predetermined respective threshold levels.

* * * * *